INVENTOR.
R. W. BROWN
ATTORNEY

United States Patent Office 3,016,142
Patented Jan. 9, 1962

3,016,142
METHOD OF AND APPARATUS FOR DISTRIBUTING AN ARTICLE TO ONE OF SEVERAL RECEIVING LOCATIONS
Raymond W. Brown, Evergreen Park, Ill., assignor to Western Electric Company, Incorporated, New York, N.Y., a corporation of New York
Filed Apr. 26, 1960, Ser. No. 24,710
7 Claims. (Cl. 209—74)

The present invention relates generally to methods of and apparatus for selectively distributing an article to one of several receiving locations, and more particularly to methods of and apparatus for distributing a series of articles to a group of receptacles in accordance with the value of a measured physical characteristic of the articles.

In various manufacturing processes, it is often desired to distribute an article (particularly a series advancing articles) to one of several receiving locations such as receptacles, work stations, or conveyors.

Accordingly, general objects of the present invention are to provide new and improved methods of and apparatus for distributing an article to one of several receiving locations.

Related objects of the invention are to provide new and improved methods of and apparatus for distributing each article in a series of advancing articles to a selected one of a group of receiving locations such as receptacles, work stations, or conveyors.

In the manufacture or processing of various types of articles, it is desirable to measure or test a series of the articles for some physical characteristic (such as weight, size, color, electrical resistance, etc.), and then to sort out or distribute the articles into a group of receptacles or receivers in accordance with the value of the measured physical characteristic.

Accordingly, more specific objects of the invention are to provide new and improved methods of and apparatus for distributing a series of articles into a group of receptacles in accordance with the value of a measured physical characteristic of the articles.

In the manufacture of deposited carbon resistors in the telephone industry, small cylindrical resistors are provided having, for example, a length of ¾ inch and a diameter of ⅛ inch. These resistors are relatively fragile and are formed with a ceramic core, a thin layer of carbon applied to the core by the decomposition of hydrocarbon gasses, and a conducting layer of silver paint at the ends thereof. In the manufacture of such resistors, the resistance value of the individual resistors in any one batch will vary somewhat from one resistor to the next, substantially all of the resistors being usable for one purpose or another. However, it is desirable to test the resistors to determine the resistance of each, and then to sort the resistors into a number of groups having predetermined maximum and minimum values of resistance.

Specific objects of the invention are to provide new and improved methods of and apparatus for sorting a batch of deposited carbon resistors into a number of groups of resistors having predetermined maximum and minimum values of resistance.

An additional object is to provide new and improved apparatus positioning for an object that is movable along two mutually perpendicular axes, particularly an apertured grid utilized in distributing articles.

With the foregoing and other objects in view, a method of distributing an article to a selected one of several receiving locations, illustrating certain aspects of the invention, may include the steps of advancing the article into one aperture of a grid that is movable along two mutually perpendicular axes X and Y and has a plurality of article-receiving apertures each of which leads to an associated receiving location. Each aperture is disposed in one of several rows parallel to the X axis and in one of several columns parallel to the Y axis. Prior to the advancing step, the grid is moved along the X axis so that a particular column containing the aperture associated with the selected receiving location registers with the line of advancement of the article. In addition, prior to the advancing step, the grid is moved along the Y axis so that a particular row containing the aperture associated with the selected receiving location registers with the line of advancement of the article.

In accordance with other aspects of the invention, an apparatus for distributing an advancing article to one of several receiving locations may include a grid mounted for movement along two mutually perpendicular axes X and Y. The grid is provided with a plurality of article-receiving apertures each leading to an associated receiving location, each aperture being disposed in one of several rows parallel to the X axis and in one of several columns parallel to the Y axis. Means are provided for moving the grid along the X axis so that each particular column of apertures may be registered with the line of advancement of the article, together with means for moving the grid along the Y axis so that each particular row of apertures may be registered with the line of advancement of the article.

Preferably, the articles form a series and are distributed into a group of receptacles in accordance with the value of a measured physical characteristic thereof. In this instance, the articles are advanced one at a time into the grid and, prior to each advancing operation, the grid is moved to that position where the next successive article will be distributed to that receptacle which corresponds to the measured value of the physical characteristic.

According to a first specific embodiment of the invention, the moving means include a pair of similarly shaped cams which are rotated in synchronism with each other so as to tend to reciprocate the grid in the X and Y directions, together with means for stopping the reciprocation of the grid in both the X and Y directions at times when the column and row containing a selected one of the apertures registers with the line of advancement of the article.

According to a second specific embodiment of the invention, the moving means include a plurality of solenoids, a plurality of mechanical linkages operated by the solenoids so as to move the grid one step in a particular direction each time the solenoids are energized, and means for controlling the energization of the solenoids so that a selected one of the apertures registers with the line of advancement of the article.

The moving mechanisms according to both specific embodiments of the invention may be utilized generally for positioning any object that is movable along two mutually perpendicular axes to a position where a selected one of a plurality of points on the object registers at a fixed position, the points being arranged so as to define a rectangular grid along the X and Y axes.

Other objects, advantages and aspects of the invention will appear from the following detailed description of specific examples and embodiments thereof, when taken in conjunction with the appended drawings, in which.

*General arrangement*

Figures 1, 2:
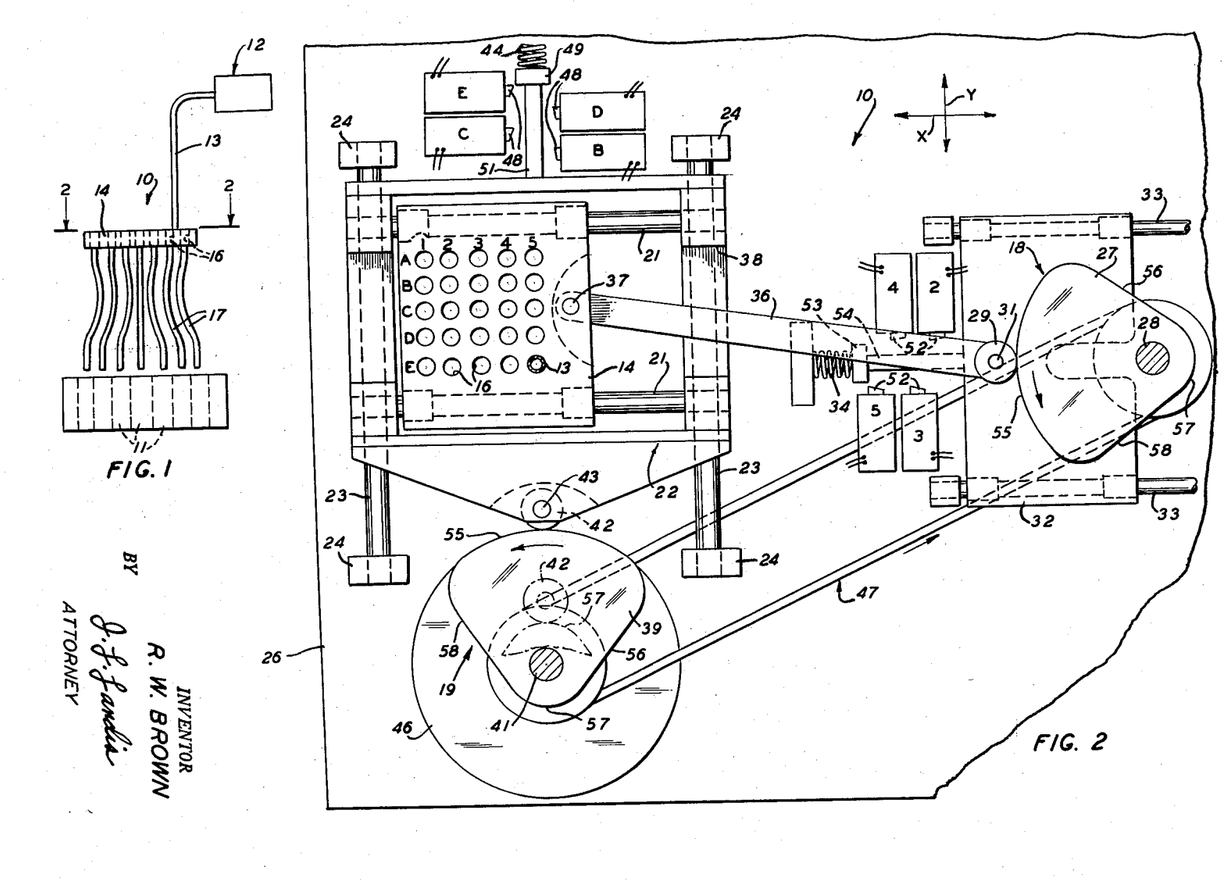
FIGURE 1 is a somewhat diagrammatic front view illustrating the general arrangement of an apparatus for processing deposited carbon resistors, which includes a distributing mechanism in accordance with the general principles of the present invention.
FIG. 2 is an enlarged plan view, taken generally along the line 2—2 of FIG. 1 and illustrating a distributing mechanism according to a first specific embodiment of the invention.

Referring now in detail to the drawings and in particular to FIG. 1, an apparatus for processing deposited carbon resistors is illustrated, which includes a distributing mechanism in accordance with the general principles of the invention that is designated generically by the numeral 10. The distributing mechanism 10 is designed for distributing or diverting each resistor in a series of deposited carbon resistors of the type described hereinbefore into a selected one of a group of receptacles or containers 11—11. While the following specific description will be directed to distributing resistors into containers, the methods and apparatus may as well be utilized to distribute various types of articles to receiving locations of diverse types.

Each individual resistor in the series is to be tested to determine the resistance thereof, as by 5% or 1% steps, and is then to be distributed into an appropriate one of the containers 11—11 in accordance with the value of the resistance. For example, with a batch of resistors expected to have values between about 100 and 160 ohms, there are provided twenty-five of the containers 11—11, so graduated in 5% steps that a first one of the containers 11—11 is designed to receive all resistors having values between 100 and 105 ohms, a second container those between 105 and 110.25 ohms, and so on in 5% steps for all twenty-five containers. In practice, the number of containers may be varied in accordance with the number of classifications into which it is desired to sort the resistors, and the maximum/minimum range of resistance for each container 11 may be set at any desired limits.

The resistance value of each resistor in the series is determined by a testing and controlling unit designated generally by the numeral 12. The tested resistors are advanced from the unit 12, one at a time, through a feed tube 13 to he distributing mechanism 10. The testing and controlling unit 12 is preferably of the general type disclosed in applicant's related copending application Serial No. 24,832, filed April 26, 1960, wherein a quick-operating electrical bridge arrangement is provided which first determines the maximum/minimum limits of each resistor and then controls the operation of the distributing mechanism 10 so as to distribute each resistor into the proper one of the containers 11—11. It should be understood, however, that various other testing devices may be utilized in conjunction wih various types of articles, and that the distributing mechanism 10 may be operated in accordance with various other selective patterns of operations.

The resistors are advanced through the feed tube 13 to a grid 14 that is mounted therebelow and constitutes a portion of the distributing mechanism 10 in accordance with both specific embodiments of the invention. The grid 14 is moved to one of several possible positions such that a selected one of a plurality of apertures 16—16 therethrough registers with the feed tube 13 for receiving the next successive resistor. Each of the apertures 16—16 leads to an associated one of the containers 11—11 either directly or, as illustrated in FIG. 1, through an associated one of a plurality of delivery tubes 17—17. The delivery tubes 17—17 are preferably made of a flexible material and have their lower ends clamped above the containers 11—11, so that their upper ends are movable with the grid 14.

*First specific embodiment*

Referring now to FIG. 2, there is illustrated a distributing mechanism in accordance with a first specific embodiment of the invention, wherein the grid 14 is mounted for free movement along two mutually perpendicular axes X and Y. In the specific example given, it is desired to sort the resistors into twenty-five groups; accordingly, twenty-five of the apertures 16—16 are provided and are arranged in a rectangular grid. Thus, each of the apertures 16—16 is disposed in one of five rows A through E parallel to the X axis and in one of five columns 1 through 5 parallel to the Y axis. Specific ones of the apertures 16—16 will hereinafter be designated by a combination of the letter designating the particular row containing that aperture and the numeral designating the particular column; thus, for example, the aperture 16 at the upper left-hand corner in FIG. 2 will be referred to as A–1 while the aperture 16 at the lower right-hand corner will be referred to as E–5.

A mechanism is provided, designated generally by the numeral 18, for moving the grid 14 stepwise along the X axis so that each particular column 1 through 5 of apertures 16—16 may be registered with the feed tube 13. In addition a corresponding mechanism is provided, designated generally by the numeral 19, for moving the grid 14 stepwise along the Y axis so that each particular row A through E of apertures 16—16 may be registered with the feed tube 13. After both of the moving mechanisms 18 and 19 have been operated to move the grid 14 to a predetermined position with respect to both the X and Y axes, a selected one of the twenty-five apertures A–1 through E–5 registers with the feed tube 13. The next successive resistor in the series is then released from the testing and controlling unit 12, advances through the feed tube 13, passes through the registered one of the apertures A–1 through E–5, and then advances through the associated delivery tube 17 to the selected container 11.

According to the first specific embodiment of the invention, the grid 14 is freely movable to the right and left as viewed in FIG. 2 along a pair of guide rods 21—21 of a carriage designed generally by the numeral 22. The carriage 22 is in turn freely movable up and down as viewed in FIG. 2 along a second pair of guide rods 23—23. Each of the guide rods 23—23 is secured between a pair of standards 24—24 that are mounted on the upper surface of a supporting table 26.

The X-moving mechanism 18 includes a rotary cam 27 that is mounted on a continuously rotating shaft 28. A cam roller 29 is mounted on a shaft 31, which is in turn secured to an auxiliary carriage 32. The auxiliary carriage 32 is mounted for sliding movement to the right and left on a pair of guide rods 33—33 and is normally biased to the right by a compression spring 34, whereby the cam roller 29 is pressed against and thereby follows the operating surface of the cam 27. One end of a connecting rod 36 is pivotably mounted on the shaft 31, while the other end is similarly mounted on a shaft 37 that is fixed to the grid 14. With this arrangement, the grid 14 tends to reciprocate in the X direction under the influence of the cam 27. The connecting rod 36 is received within a slot 38 in the carriage 22 so that the connecting rod may move freely, irrespective of any movement of the carriage 22 in the Y direction.

In a corresponding fashion, the Y-moving mechanism 19 includes a rotary cam 39 having a shape similar to that of the cam 27 and mounted on a continuously rotating shaft 41. A cam roller 42 is carried by the carriage 22 on a shaft 43 and is biased into contact with the operating surface of the cam 39 by a compression spring 44 shown at the top of FIG. 2. With this arrangement, the carriage 22 and the grid 14 mounted thereon tend to reciprocate in the Y direction under the influence of the cam 39.

The two cams 27 and 39 are rotated in a counter-clockwise direction (FIG. 2), in synchronism with each other, by a motor 46 that is arranged for rotating the cam shaft 41 directly and the cam shaft 28 through the intermission of a 1:1 belt-and-pulley transmission designated generally by the numeral 47.

A series of four individual solenoid-operated plungers 48—48 is provided for stopping the reciprocation of the grid 14 in the Y direction at a time when a selected one of the rows B through E registers with the feed tube 13. Each of the four plungers 48—48 may be extended toward the center, as viewed in FIG. 2, by an associated one of four operating solenoids identified by the letters B through E in accordance with the associated row of apertures 16—16. When extended, the plungers 48—48 will engage a collar 49 that is mounted to the carriage 22 by a shaft 51 and thus preclude further movement of the carriage 22 and grid 14 in the Y direction.

A series of four solenoid-operated plungers 52—52 is similarly provided for stopping the reciprocation of the grid 14 in the X direction at a time when a selected one of the columns 2 through 5 registers with the feed tube 13. The plungers 52—52 may be extended toward the center, as viewed in FIG. 2, by an associated one of four operating solenoids designated by the numerals 2 through 5 in accordance with the associated columns. When extended, the plungers 52—52 will engage a collar 53 that is mounted on a shaft 54 of the auxiliary carriage 32 so as to preclude further movement of the grid 14 in the X direction.

At the beginning of each distributing cycle, the apparatus is arranged as is illustrated in FIG. 2 where large-radius dwell portions 55—55 of the cams 27 and 39 have moved the grid 14 to the initial upper left-hand position illustrated. In the initial position, the lower right aperture E–5 is preferably aligned with the feed tube 13. In the alternative, the grid 14 may be positioned further to the left, further upward, or both, so that none of the apertures 16—16 is initially aligned with the feed tube 13 but so that the aperture E–5 will first be brought into alignment as the grid 14 is moved downward and to the right during the cycle.

The grid 14 remains motionless in the initial position during a first stage of the cycle while the large-radius dwell portions 55—55 of the cams 27 and 39 oppose the associated cam rollers 29 and 43. During this first portion of the cycle, the testing and controlling unit 12 operates to determine the maximum/minimum limits of the next resistor and energize the associated ones of the operating solenoids B through E and 2 through 5. In a simplified arrangement, selected ones of those solenoids could be operated through manually controlled switches in accordance with any described pattern of operation.

As the cams 27 and 39 continue rotating, a pair of inwardly tapering sections 56—56 of the cams 27 and 39 are presented to the cam rollers 29 and 42, whereby the grid 14 moves downward and to the right until it is stopped either (1) by an extended one of the plungers 48—48 and 52—52; or (2), when none of the plungers 48—48 or 52—52 are extended, by one of a pair of small-radius dwell portions 57—57 of the cams 27 and 39.

In the event that the next resistor in the series is to be received in one of the five apertures 16—16 along the row E, the solenoid E is energized so as to extend the associated plunger 48 and thus stop any downward movement of the grid 14 at a point where the lowest row of apertures E registers or remains in registry with the feed tube 13. Similarly, if the selected aperture is in one of the rows D, C, or B, then the respective one of the solenoids D, C, or B is energized so as to stop the downward movement of the grid 14 in a position where the respective row D, C, or B registers with the feed tube 13. When the selected aperture 16 is in the uppermost row A, the small-radius dwell portion 57 of the cam 39 stops the grid 14 in a position where the row A is in registry. If necessary, an additional solenoid and plunger (not shown) could be utilized to stop the grid 14 in this lowermost position.

In a corresponding fashion, when the selected aperture 16 is in one of the columns 2 through 5, the associated one of the solenoids 2 through 5 is energized to extend the associated plunger 52 and thus stop the rightward movement of the grid 14 at a position where the respective columns 2 through 5 register with the feed tube 13. When the selected aperture 16 is in row 1, none of the plungers 52—52 are extended and the grid 14 is stopped in the registered position where the cam roller 29 rides on the small-radius dwell portion 57 of the cam 27.

With the foregoing arrangement, it is apparent that each resistor in the series may be distributed through the feed tube 13 into a selected one of the twenty-five receiving apertures A–1 through E–5 to an associated one of the containers 11—11 in accordance with the energization or nonenergization of selected ones of the operating solenoids B through E and 2 through 5. The resistor is released at the time that the cams 27 and 39 have been rotated through an angle of approximately 180° from the initial position, any operated ones of the solenoids B through E and 2 through 5 are then de-energized, and the grid 14 is returned to the initial position by a pair of outwardly tapering cam sections 58—58.

It is apparent that the moving mechanisms 18 and 19 of the first specific embodiment of the invention may be utilized, generically, for moving any object that is movable along two mutually perpendicular axes X and Y to a position where any one of a plurality of points on the object (the apertures 16—16) registers at a fixed location (the feed tube 13). The points define a rectangular grid having $m$ rows parallel to the X axis and $n$ columns parallel to the Y axis, $m$ and $n$ being at least two. In the specific example described hereinbefore, $m$ and $n$ are both equal to five.

*Second specific embodiment*

Figure 3:
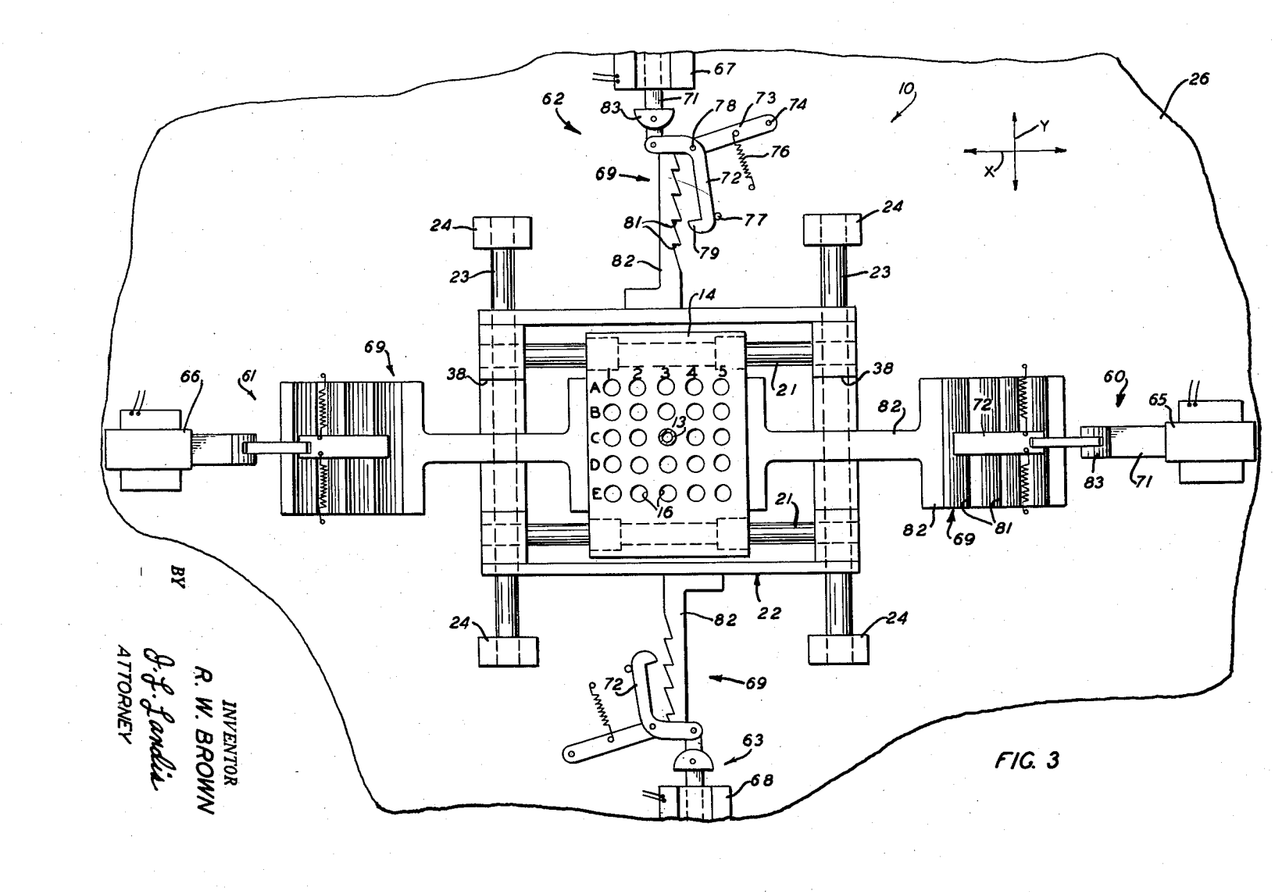
FIG. 3 is a plan view similar to FIG. 2, but illustrating a distributing mechanism in accordance with a second specific embodiment of the invention.
Figure 4A:
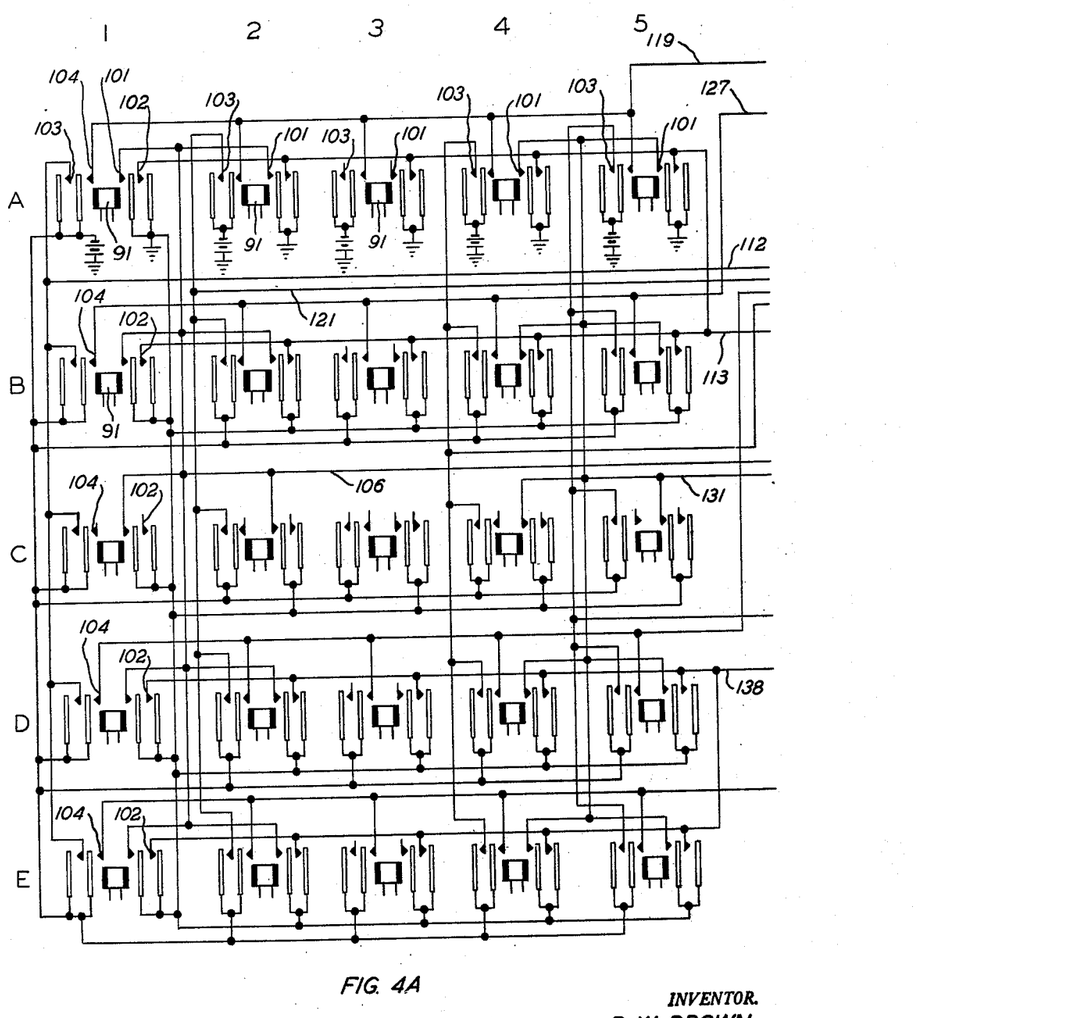
FIGS. 4A and 4B, when assembled as indicated in FIG. 4C, constitute a diagram of an electrical control circuit for operating the distributing mechanism illustrated in FIG. 3.
Figure 4B:
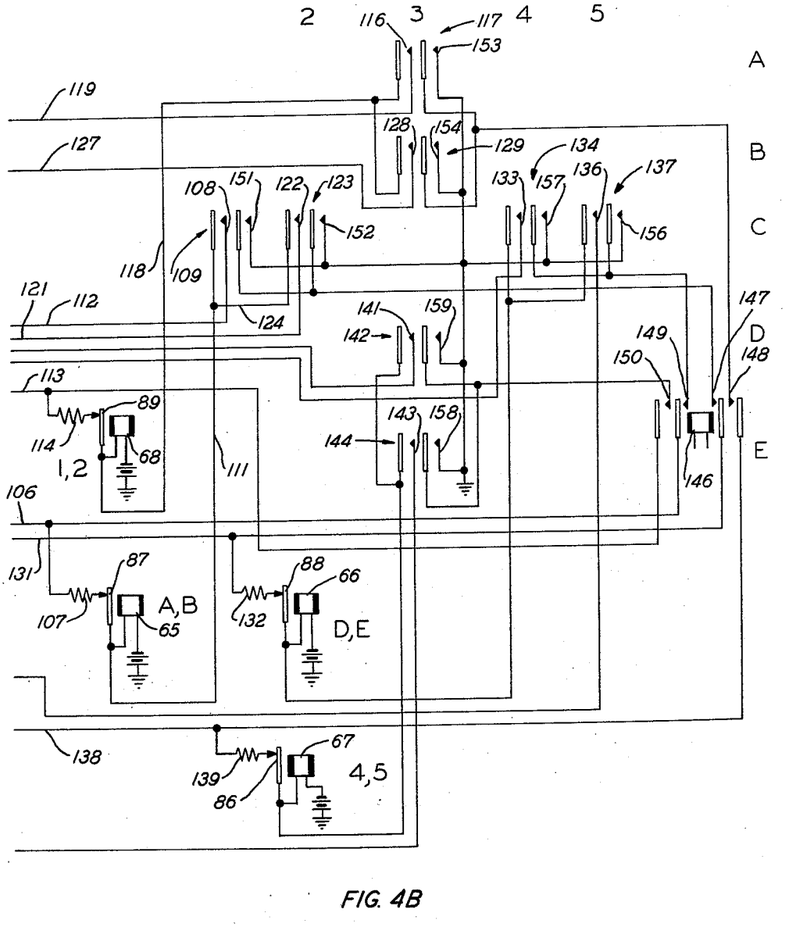
Figure 4C:
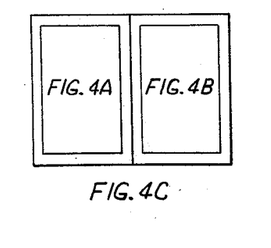

A distributing mechanism in accordance with a second specific embodiment of the invention is illustrated in FIGS. 3 and 4, and includes a grid 14 which may be formed exactly as was described with respect to the first embodiment of the invention. Thus, the grid 14 is provided with twenty-five apertures 16—16 arranged in rows A through E parallel to the X axis and in columns 1 through 5 parallel to the Y axis. As in the first embodiment, the grid 14 is freely movable to the left and right on a pair of guide rods 21—21 of a carriage 22, and the carriage 22 is freely movable along the Y axis on a pair of guide rods 23—23 that are mounted on a table 26 in standards 24—24.

In the second embodiment, the grid 14 is initially positioned, as viewed in FIG. 3, so that the central aperture C–3 aligns with the feed tube 13 and the grid 14 is returned to this position after each distributing step. The following moving or positioning mechanisms are provided: a mechanism designated generally by the numeral 60 for moving the grid 14 either one or two steps to the right (the +X direction) to bring columns 2 and 1 respectively into registry with the feed tube 13; a mechanism 61 for moving the grid 14 either one or two steps to the left (the −X direction) to bring either of the columns 4 and 5 into registry; a mechanism 62 for moving the carriage 22 and thus the grid 14 one or two steps upward as viewed in FIG. 3 (the +Y direction) to bring either of the rows D and E into registry; and a mechanism 63 for moving the grid 14 either one or two steps downward (the −Y direction) to bring either of the rows B and A into registry.

When the selected aperture 16 lies in the central row C, neither of the Y-moving mechanisms 62 and 63 is operated; and, when that aperture lies in the central column 3, neither of the moving mechanisms 60 and 61 is operated. It will thus be apparent that any of the twenty-five apertures A–1 through E–5 may be brought into alignment with the feed tube 13 by the operation of selected ones of the moving mechanisms 60 through 63 in either one or two steps.

The moving mechanisms 60 through 63 include operating solenoids designated respectively by the numerals 65, 66, 67 and 68. Each of the operating solenoids functions through a mechanical linkage designated generally by the numeral 69 to move the grid 14 one step in the associated direction each time that solenoid is energized. Referring particularly to the linkage 69 at the top of FIG. 3, each mechanical linkage 69 includes a plunger 71 of the associated solenoid, and a curved pawl 72 that is pivotably mounted to both the plunger 71 and a link 73. The link 73 is pivotably mounted about a fixed pin 74, and is biased in a counterclockwise direction about the pin 74 by an extension spring 76. The spring 76 urges the pawl 72 to a rest position against a stopping pin 77.

When the solenoid 67 is energized and the plunger 71 is thereby moved upward (away from the grid 14), the pawl 72 is first pivoted in a clockwise direction about a pivot pin 78 (which connects the pawl 72 to the link 73) until an operating tooth 79 of the pawl 72 engages an adjacent notch 81 of a ratch 82 that is secured to the carriage 22. After the tooth 79 has engaged the notch 81, the plunger 71 continues to move upward until a plate 83 connected thereto engages the solenoid 67, at which time row D is registered with the feed tube 13. During this movement, the pawl 72 pulls the ratch 82, and thus the carriage 22 and grid 14, upward while the link 73 swings in a clockwise direction about the pivot pin 74 so as to stretch the spring 76.

Four of the ratches 82—82 are provided, and are mounted respectively to the right side of the grid 14, the left side thereof, the top surface of the carriage 22, and the bottom surface thereof. The total distance of movement of each plunger 71 is so arranged that the grid 14 moves one full step in the associated direction each time that the associated one of the solenoids 65 through 68 is energized.

As illustrated in FIG. 4B, a normally closed limit switch 86 is disposed in the energization circuit for the operating solenoid 67 and is opened each time that the plate 83 has been drawn to the solenoid 67 so as to break the energization circuit for the solenoid 67. Referring again to FIG. 3, as soon as the energization circuit has been broken, the spring 76 is effective to pivot the link 73 and pawl 72 back to the rest position illustrated in FIG. 3; however, the next lower notch 81 of the ratch 82 is now adjacent to the tooth 79 of the pawl 72.

In the event that the energization circuit for the solenoid 67 has not otherwise been broken or short circuited after the first step (as will be discussed in detail hereinafter with respect to the control circuit of FIG. 4B), the solenoid 67 is again energized to move the grid 14 a second full step upward to bring the row E into alignment with the feed tube 13.

Each of the other solenoids 65, 66 and 68 may be similarly operated to move the grid 14 either one or two steps in the associated direction. For this purpose, three additional limit switches 87, 88 and 89 are provided, which are associated respectively with the solenoids 65, 66 and 68 and function similarly to the limit switch 86 previously described so as to break the energization circuit for the associated solenoids 65, 66 and 68 after each moving step.

After the grid 14 has been moved to the proper position (the time being controlled, for example, by a timing cam associated in the testing and controlling unit 12), the next successive resistor is released through the feed tube 13 and passes through the registered one of the apertures A–1 through E–5 to the associated container 11. After each resistor has been so distributed, those ones of the solenoids 65 through 68 which are opposite in action to the ones which were energized during the previous moving operation are operated in a corresponding number of steps to return the grid 14 to the initial position where the apertures C–3 registers with the feed tube 13.

A control circuit for operating the solenoids 65 through 68 as described hereinabove is illustrated in FIGS. 4A and 4B, and includes a group of twenty-five operating relays 91—91 (FIG. 4A) that are associated one with each of the apertures A–1 through E–5 and will be correspondingly identified. Conveniently, the relays 91—91 are arranged in five rows A through E and in five columns 1 through 5 so that they define a grid corresponding to the associated apertures 16—16. The relays A–1 through E–5 are individually energized by the testing and controlling mechanism 12 in accordance with the value of the next successive resistor to that the corresponding aperture 16 will be registered with the feed tube 13.

Each of the control relays 91—91 is provided with a pair of primary contacts 101 and 102 which are designed respectively for energizing the appropriate ones of the X and Y-operating solenoids. Each control relay 91 is further provided with a pair of secondary contacts 103 and 104, which are arranged respectively for shorting out the operating solenoids after either one or two steps in the appropriate directions.

For the purposes of illustration, it will first be assumed that the relay A–1 at the upper left-hand corner of FIG. 4A has been energized, which relay is designed for controlling the moving operation so that the grid 14 moves exactly two steps to the right and two steps downward, as viewed in FIG. 3, to align the aperture A–1 with the feed tube 13. The two-step moving movement to the right is accomplished in the following manner: the primary contact 101 closes so as to energize the solenoid 65 through a common conductor 106, a resistance 107, and the normally closed limit switch 87; the solenoid 65 then operates as previously described to move the grid 14 one full step to the right; the solenoid 65 again operates to move the grid 14 a second step to the right when the limit switch 87 opens and recloses after the first step; and the grid 14 then closes a first contact 108 of a limit switch 109 after the grid 14 has been moved two full steps to the right, whereupon the solenoid 65 is precluded from further operation and is effectively short-circuited through a conductor 111, the now closed contact 108 of the limit switch 109, a conductor 112, and the secondary contact 103 of the relay A–1.

In a similar fashion and at the same time, the grid 14 is moved precisely two steps downward in the following manner: the solenoid 68 is energized upon the closure of the primary contact 102 of the relay A–1 through a conductor 113, a resistor 114 and the normally closed limit switch 89 associated with the solenoid 68; the solenoid 68 next operates to move the grid 14 downward two full steps; and the grid 14 then closes a first contact 116 of a limit switch 117 that is responsive to two full steps of movement downward, whereafter the solenoid 68 is shunted by a conductor 118, the now closed contact 116, a conductor 119, and the secondary contact 104 of the relay A–1.

The contact 101 of each control relay 91 in column 1 is connected to the common conductor 106 so as to energize the solenoid 65 in a similar manner, and each contact 103 in column 1 is connected to the conductor 112 so as to preclude further energization of the solenoid 65 after two steps of movement. In corresponding fashion, each contact 102 of the control relays in the upper row A is connected to the conductor 113, and each contact 104 is connected to the conductor 119, so as to operate the solenoid 68 and thus move the grid 14 through two downward steps as previously described and then shunt the solenoid 68.

All of the control relays 91—91 in column 2 have their contacts 101—101 connected to the common conductor 106 so as to energize the solenoid 65 in the manner previously described; however, the contacts 103—103 of those relays are connected through a common conductor 121 to a first contact 122 of a limit switch 123. The switch 123 is similar to the switch 109, but is closed after only one step of movement by the grid 14 to the right so as to shunt out the solenoid 65 through a branch conductor 124 and the conductor 121 after the grid 14 has been moved one step to the right. As was the case with row A, all contacts 102—102 of the relays in row B are connected to the common conductor 113 so as to energize the solenoid 68 to move the grid 14 downward; however, the contacts 104—104 of those relays in row B are connected through a common conductor 127 to a first contact 128 of a limit switch 129 that is responsive to one downward step of the grid 14 so as to short out the solenoid 68 after only one downward step.

The contacts 101 and 103 of all relays in the middle column 3 are not connected at all (and could be dispensed with) because no movement to the left or right is desired when one of the apertures 16—16 in the column 3 is selected. Similarly, the contacts 102 and 104 of all relays in the middle row C are not connected since no movement up or down is desired when one of the apertures 16—16 in row C is selected. Thus, it should be noted that the central relay C-3 could be omitted entirely, as none of the illustrated contacts are connected; however, all of the control relays are preferably provided with additional contacts (not shown) that indicate the operation of the device and, for example, operate counting circuits or signal lights.

The contacts 101—101 of all relays in column 4 are connected through a common conductor 131 and a resistor 132 to energize the solenoid 66 for moving the grid 14 to the left, while the contacts 103—103 in column 4 function to short circuit the solenoid 66 through a first contact 133 of a limit switch 134 after the grid 14 has been moved one step to the left. In a corresponding manner, the contacts 101—101 of all relays in column 5 are connected through the common conductor 131 so as to energize the solenoid 66, while the contacts 103—103 in column 5 operate through a first contact 136 of a limit switch 137 to shunt the solenoid 66 after it has moved the grid 14 through two full steps to the left.

The contacts 102—102 of all relays in row D are connected through a common conductor 138 so as to energize the solenoid 67 through a resistor 139 to move the grid 14 upward, while the contacts 104—104 in this row are disposed so as to short circuit the solenoid 67 through a first contact 141 of a limit switch 142 after the grid 14 has been moved one step upward. The contacts 102—102 of the relays in the fifth row E are similarly connected through the conductor 138 to energize the solenoid 67; however, the contacts 104—104 in this row are effective through a first contact 143 of a limit switch 144 to short out the solenoid 67 after the grid 14 has been moved through two full steps upward.

The limit switches 109, 116, 123, 129, 134, 137, 142 and 144 are illustrated only in the electrical drawing, but may be of any conventional type that is responsive to predetermined movement of an object such as the grid 14. For example, an elongated bar (not shown) might be mounted to the under surface of the plate parallel to the Y axis for engaging an actuator member of the limit switches 109, 123, 134 and 137 respectively after two steps of movement to the right, one step to the right, one step to the left, and two steps to the left. In similar fashion, an elongated bar (not shown) might be mounted to the under surface of the carriage parallel to the X axis for operating the limit switches 117, 129, 142 and 144 in the proper order. The provision of elongated bars allows operation of the stationary switches even though there is simultaneous shifting of the bars in the direction of their length when the grid is simultaneously moved in both directions.

After each distributing operation, a return relay 146 is energized (for example, through a timing mechanism forming a portion of the testing and controlling unit 12) to close each of four contacts 147, 148, 149 and 150. The contact 147 is connected to energize the solenoid 66 through the resistor 132 so as to return the grid 14 to the neutral position in either one or two steps to the left in those instances where the solenoid 65 was previously operated to move the grid 14 to the right. For this purpose, the circuit through the contact 147 to the solenoid 66 passes to ground in parallel through a parallel combination of a second contact 151 of the switch 109 and a second contact 152 of the switch 123, which switches are closed respectively when the grid 14 has previously been moved two steps and one step to the right.

The second contact 148 of the return relay 146 is similarly effective through a parallel connection of a second contact 153 of the switch 117 and a second contact 154 of the switch 129 to energize the solenoid 67 and thus move the grid 14 upward to the neutral position whenever the grid 14 had previously been moved downward. The third contact 149 of the return relay 146 is connected through a parallel combination of a second contact 156 of the switch 137 and a second contact 157 of the switch 134 so as to actuate the solenoid 65 to return the grid 14 to the neutral position whenever it had previously been moved to the left. In substantially the same manner, the fourth contact 150 is effective through a parallel connection of a second contact 158 of the limit switch 144 and a second contact 159 of the limit switch 142 to energize the solenoid 68 and thus return the grid 14 to the neutral position whenever it had previously been moved upward.

Whenever the grid 14 had not been moved in either or both of the X and Y directions, the associated second contacts 151—154 and 156—159 will not have been closed and, therefore, the return relay 146 will be ineffective to energize the associated operating solenoids 65—68. With this arrangement, it is apparent that the energization of the return relay 146 is effective to return the grid 14 to the neutral position irrespective of the position thereof at the end of the distributing operation. For this purpose (FIG. 3), four notches 81—81 are provided on each of the ratches 82—82, with the outermost two notches being used only for returning the grid 14 to the neutral position.

It is obvious that the moving mechanisms such as 60 through 63 in accordance with the second specific embodiment of the invention may be utilized generally for moving any object that is movable along two mutually perpendicular axes X and Y to selected positions corresponding to at least either one or two steps of movement in each direction from an initial position. For many applications, it would be desired to have more than two steps of movement in at least one of the directions, in which situation additional limit switches and secondary contacts similar to the switches such as 129 and 153 and the secondary contacts 103 and 104 would be provided.

While various specific examples and embodiments of the invention have been described in detail hereinabove, it will be obvious that various modifications may be made from the specific details described without departing from the spirit and scope of the invention.

For example, while the distributing mechanisms disclosed hereinbefore find a high degree of utility in combination with a testing and controlling unit 12 in accordance with the principles of applicant's copending application, such mechanisms may be utilized to distribute diverse articles to various types of receiving location in accordance with different selected patterns of operation. It is apparent that the grid 14 may be moved manually along the X and Y axes so that a selected one of the apertures registers at a particular point, and then the article may be advanced or placed into the selected aperture.

What is claimed is:

1. Apparatus for distributing an advancing article to one of several receiving locations, which comprises a grid mounted for movement along two mutually perpendicular axes X and Y and having a plurality of article-receiving apertures each of which leads to an associated one of the receiving locations, each aperture being disposed in one of several rows parallel to the X axis and in one of several columns parallel to the Y axis; a pair of similarly shaped cams; a pair of cam followers, each of which is arranged so as to move said grid in an associated one of the X and Y directions; means for rotating said cams in synchronism with each other, said cams being so shaped that said grid tends to reciprocate in the X direction under the influence of one cam and in the Y direction under the influence of the other cam; means for stopping the reciprocation of said grid in the X direction at a time when the column containing the aperture associated with a selected receiving location registers with the line of advancement of the article; and means for stopping the reciprocation of said grid in the Y direction at a time when the row containing the aperture associated with the selected receiving location registers with the line of advancement of the article.

2. The distributing apparatus as recited in claim 1, wherein each of the cams is symmetrical and is formed with opposing dwell portions of maximum and minimum radius connected by tapering sections on each side, wherein one dwell portion of each cam is designed to allow the grid to dwell in an initial diagonal position where one corner aperture registers with the line of advancement of the article, and wherein the other dwell portion of each cam is designed to allow the grid to dwell in a diagonal position where the opposite corner aperture registers with the line of advancement of the article.

3. Apparatus for positioning an object that is movable along two mutually perpendicular axes X and Y to a position where any selected one of a plurality of points on the object registers at a fixed location, the points defining a rectangular grid having $m$ rows parallel to the X axis and $n$ columns parallel to the Y axis, $m$ and $n$ being at least two, which apparatus comprises a pair of similarly shaped cams; a pair of cam followers, each of which is arranged so as to move the object in an associated one of the X and Y directions; means for rotating said cams in synchronism with each other, said cams being so shaped that the object tends to reciprocate in the X direction under the influence of one cam and in the Y direction under the influence of the other cam; means for stopping the reciprocation of the object in the X direction at a time when the column containing a selected one of the points registers with the fixed location; and means for stopping the reciprocation of the object in the Y direction at a time when the row containing the selected point registers with the fixed location.

4. Apparatus for distributing an advancing article to one of several receiving locations, which comprises a grid mounted for movement along two mutually perpendicular axes X and Y and having a plurality of article-receiving apertures each of which leads to an associated one of the receiving locations, each aperture being disposed in one of several rows parallel to the X axis and in one of several columns parallel to the Y axis; four solenoids, one of which is effective to move the grid in each of the $+X$, $-X$, $+Y$, and $-Y$ directions; four pawls operated one by each solenoid; four ratches engageable one with each pawl; the solenoids, pawls and ratches being so constructed and arranged that, each time one of the solenoids is energized, that solenoid operates the associated pawl and ratch to move the grid one step in the associated direction so that a different aperture registers with the line of advancement of the article; and means for controlling the energization of said solenoids so that the aperture associated with a selected receiving location registers with the line of advancement of the article.

5. Apparatus for distributing an advancing article to one of a group of at least nine receiving locations, which comprises a grid mounted for movement along two mutually perpendicular axes X and Y and having a group of article-receiving apertures each of which leads to an associated one of the receiving locations, each aperture being disposed in one of several rows parallel to the X axis and in one of several columns parallel to the Y axis, the grid being initially positioned so that it must be moved in at least two steps in both the X and Y directions to bring one of the apertures into registry; a group of solenoids; a group of mechanical linkages, one of which is associated with each solenoid and is designed for moving said grid one step in an associated one of the X and Y directions each time the associated solenoid is energized; a group of selectively actuable control relays associated one with each of the apertures, each control relay that is associated with one of the apertures that is displaced from the initial position in the X direction having a primary contact that is designed for energizing the X-operating solenoid, each control relay that is associated with one of the apertures that is displaced from the initial position in the Y direction having a primary contact that is designed for energizing the Y-operating solenoid; means for temporarily interrupting the energization of each of the operating solenoids after it has operated to move the grid one step in the associated direction; a group of limit switches arranged so that there is one limit switch which is closed after each of the possible steps of movement in each of the X and Y directions, each control relay that is associated with one of the apertures that is displaced in the X direction having a secondary contact that is connected in series with the limit switch which corresponds to the associated number of steps of movement in the X direction, each control relay that is associated with one of the positions that is displaced in the Y direction having a secondary contact that is connected in series with the limit switch which corresponds to the associated number of steps of movement in the Y direction; and means responsive to the concomitant closure of each secondary contact and the associated limit switch for precluding further operation of the associated operating solenoid.

6. The distributing apparatus as recited in claim 5, wherein a return relay is provided having four contacts, each of which is connected in series with one of the four operating solenoids and in parallel with additional contacts of those limit switches which are closed when the grid has been previously moved in the direction opposite to that in which the associated operating solenoid will move the grid.

7. Apparatus for positioning an object that is movable along two mutually perpendicular axes X and Y to a position where any selected one of plurality of points on the object registers at a fixed location, the points defining a rectangular grid having $m$ rows parallel to the X axis and $n$ columns parallel to the Y axis, $m$ and $n$ being at least three, the object being initially positioned so that it must be moved at least two steps in both the X and Y directions to bring one of the points into registry, which apparatus comprises a pair of operating solenoids; a pair of mechanical linkages, one of which is associated with each solenoid and is designed to move the object one step in an associated one of the X and Y directions each time the associated solenoid is energized; a group of selectively operable control relays associated one with each of the points, each control relay that is associated with one of the points that is displaced from the initial position in the X direction having a primary contact that is designed for energzing the X-operating solenoid, each control relay that is associated with one of the points that is displaced from the initial position in the Y direction having a primary contact that is designed for energizing the Y-operating solenoid; means for temporarily interrupting the energization of each of said operating solenoids after it has operated to move the object one step in the associated direction; a group of limit switches arranged so that there is one limit switch which is closed after each of the possible steps of movement in each of the X and Y directions, each control relay that is associated with one of the points that is displaced in the X direction having a secondary contact that is connected in series with the limit switch which corresponds to the associated number of steps of movement in the X direction, each control relay that is associated with one of the positions that is displaced in the Y direction having a secondary contact that is connected in series with the limit switch which corresponds to the associated number of steps of movement in the Y direction; and means responsive to the concomitant closure of each secondary contact and the associated limit switch for precluding further operation of the associated operating solenoid.

References Cited in the file of this patent

UNITED STATES PATENTS

| | | |
|---|---|---|
| 798,609 | Lessig | Sept. 5, 1905 |
| 2,752,039 | Woodell | June 26, 1956 |

UNITED STATES PATENT OFFICE
CERTIFICATE OF CORRECTION

Patent No. 3,016,142　　　　　　　　　　　　　　　　January 9, 1962

Raymond W. Brown

It is hereby certified that error appears in the above numbered patent requiring correction and that the said Letters Patent should read as corrected below.

Column 1, line 18, after "series" insert -- of --; line 31, for "articles" read -- article --; line 63, after "apparatus" insert -- for --; same line, after "positioning" strike out "for", line 69, for "steps" read -- step --; column 3, line 20, for "articles" read -- article --; line 42, for "he" read -- the --; line 52, for "wih" read -- with --; same line, for "articles" read -- article --; lines 55 and 56, for "operations" read -- operation --; column 6, line 72, for "moving" read -- X-moving --; column 8, line 2, for "apertures" read -- aperture --; line 14, for "to" read -- so --; column 12, line 50, after "of" insert -- a --.

Signed and sealed this 29th day of May 1962.

(SEAL)
Attest:
ERNEST W. SWIDER
Attesting Officer

DAVID L. LADD
Commissioner of Patents